March 14, 1933.  J. W. HORTON  1,901,344
POWER LEVEL INDICATOR
Filed June 27, 1931
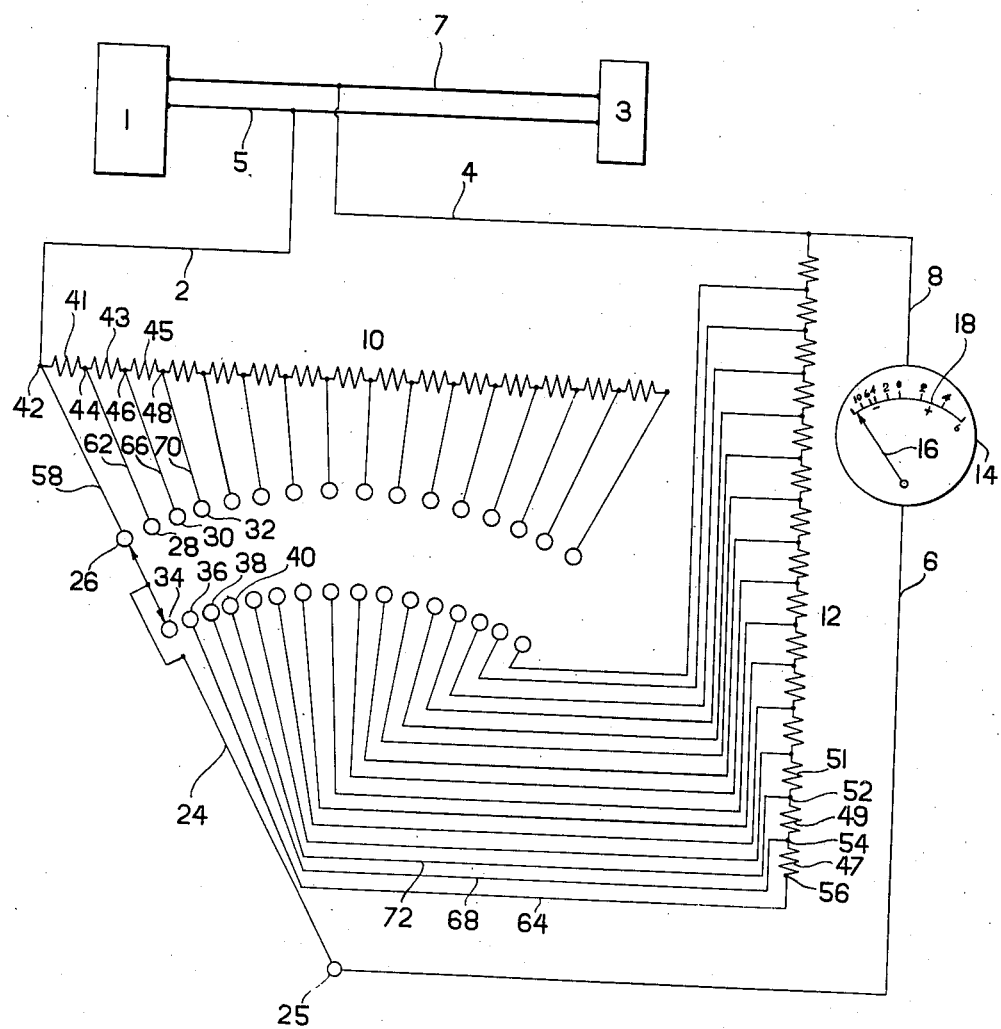
Inventor
Joseph W. Horton
By ⟨signature⟩
Attorney Patented Mar. 14, 1933

1,901,344

UNITED STATES PATENT OFFICE

JOSEPH WARREN HORTON, OF CAMBRIDGE, MASSACHUSETTS, ASSIGNOR TO GENERAL RADIO COMPANY, OF CAMBRIDGE, MASSACHUSETTS, A CORPORATION OF MASSACHUSETTS

POWER-LEVEL INDICATOR

Application filed June 27, 1931. Serial No. 547,444.

The present invention relates to electric systems and methods, and more particularly to power-level indicators for indicating the level of power in a system, such as a telephone transmission circuit.

In many types of electric systems, where power is transmitted from a source of electric power to a load, it is desirable to measure or control the electric power transmitted along the junction between the source and the load. The importance of maintaining a careful check upon the signal amplitude at various points in voice-transmission circuits, for example, is well recognized by acoustic engineers. Too low a level means interference from background noises; too high a level means overloading of amplifiers and reproducers and the introduction of crosstalk into nearby channels.

An object of the invention is to provide a new and improved method of and apparatus for effecting measurements of the above described character, to the ends that the efficiency of the measurements may be enhanced, the measurements themselves more easily made, and the apparatus employed simplified and cheapened. Other and further objects will be explained hereinafter.

The invention will now be explained in connection with the accompanying drawing, the single figure of which is a diagrammatic view of circuits and apparatus arranged and constructed according to a preferred embodiment of the invention.

In the accompanying drawing, electric power is assumed to be delivered from a source or generator 1 to a load 3 along a junction, illustrated as comprising conductors 5, 7. One side of the junction 5, 7 may, for example, be an incoming telephone line, and the other side the outgoing line. It is desired to measure the electric power delivered across this junction 5, 7 to the load 3. If the impedance of the load 3 is known, the power delivered may be completely determined by a measurement of the voltage at the junction.

The junction is tapped at a point between the incoming and outgoing lines by conductors 2, 4 that constitute an input connection for a suitable attenuation network. This network serves as a multiplier for increasing the range of the instrument and is so designed as to maintain the input impedance constant regardless of setting. The network is connected to an indicating voltmeter 14 that may be so calibrated as to permit reading directly the electrical power delivered to the load 3. This calibration is based on the known value of the load impedance. Both the attenuation network and the indicating meter may be calibrated in logarithmic units, such as the decibel, by which the power actually delivered to the load is expressed as the logarithm of its ratio to some arbitrary reference power. The actual power level at which energy is delivered to the load may, under these conditions, be obtained by taking the sum of the readings of the multiplier switch and of the meter.

The network may assume any of a number of different forms, but is illustrated, for simplicity, as a single, inert, L-type, attenuation section consisting of a variable series resistor branch or arm 10 and a variable shunt resistor branch or arm 12. The meter 14 is connected in the output connection, and is provided with an indicator 16 adapted to travel over a suitably graduated scale 18. The meter 14 may be of any desired type, such as the thermionic, thermocouple, and the hot-wire types, but it is preferred to employ a voltmeter of the copper-oxide-rectifier type.

The indicator 16 is slightly damped to prevent any undue overthrow on sudden, short-time-interval surges or sudden variations, such as take place at normal syllabic frequencies, but the construction is such as to permit the needle to respond to longer impulses, or those varying at the desired rate. The design may be such that the graduation of the scale 18 shall be approximately proportional to the mean syllabic frequency, or any other desired value, and may cover the whole voice spectrum. The indicator does not follow each sudden variation, but reads a mean power value. This result may be brought about in any desired way, as by suitably designing the structure and the shape of the shell about which is wound the coil for controlling the movements of the indicator.

The meter scale and the attenuation network are preferably calibrated in logarithmic, electrical transmission units, preferably decibels, for any desired load impedance, preferably 500 ohms. This method of measuring power may be defined as follows. Let $P_2$ represent the power delivered across junction 5, 7 from the source 1 to the load 3, and let $P_1$ represent an arbitrarily chosen reference power as, for example, 0.006 watt. The power actually delivered to the load may then be expressed in terms of the arbitrary reference level by means of the equation $$N = 10 \log_{10} \frac{P_2}{P_1}$$

where N is the number of decibels expressing the ratio of the power actually transmitted to the reference power. Using the quantities already mentioned as representing typical cases, namely, a load impedance of 500 ohms and a reference power level of 0.006 watt, the reference power is obtained when the voltage across the junction is $$V_1 = \sqrt{RP} = \sqrt{3} = 1.73 \text{ volts}$$

Whenever the power-level-indicating instrument is connected across the input junction to a 500-ohm load, the power level is $$N = 20 \log_{10} \frac{V_2}{1.73}$$

decibels above reference levels, where $V_2$ is the actual voltage existing at the junction. Should the power-level-indicating instrument be connected across the input junction of loads 3 having a value of impedance other than the 500 ohms for which the instrument was calibrated, there will be a correction factor of $$N_1 = 10 \log_{10} \frac{500}{\text{load resistance}} \text{ decibels}$$

The number of decibels given by this equation is to be added to the sum of the readings of the multiplier scale and of the meter.

To extend the range of measurement of the instrument beyond that possible with the indicating meter 14 alone, it is provided with a contact arm 24 pivoted at 25, and adapted to occupy any desired number of positions, sixteen being illustrated. The contact arm 24 contacts with a pair of contact members 26, 34, in its first position; a second pair of contact members 28, 36, in its second position; a third pair of contact members 30, 38 in its third position; a fourth pair of contact members 32, 40 in its fourth position, and so on. Any desired number of pairs of contact members may be employed (sixteen being illustrated), depending upon the range for which the instrument is designed.

To explain the operation, let it be assumed that the indications of the indicator 16 on the scale 18 are correctly given on the scale when the contact arm 24 occupies its first position, in which it contacts with the contact members 26 and 34. Then, when the contact arm 24 occupies its second position, in which it contacts with the contact members 28 and 36, the readings of the indicator 16 on the scale 18 should be added to the reading corresponding to the position of the contact arm 24, when occupying this second position; and similarly, when the contact arm occupies its third and fourth and other positions, in which it contacts with the pair of contact members 30 and 38 and the pair of contact members 32 and 40, respectively; and so on. If the range is 16 decibels in the initial position of the contact arm 24, the range may thus be increased by designing the instrument so that the scale may be graduated in steps of 2 decibels to cover the range, for example, from $-10$ decibels to $+6$ decibels, so as to read directly when across a 500-ohm line. The network will then be designed so that the adjustments of the contact arm 24 shall correspond to steps of 2 decibels.

With the instrument so designed, and because the units are logarithmic, the total power level, in decibels, is obtained by adding the scale reading to the multiplier readings. The instrument will thus represent the level as so many decibels above or below the reference level.

A feature of the invention resides in having the input impedance substantially the same irrespective of the adjustment of the contact arm 24. To this end, the branches 10 and 12 are respectively divided into suitably designed sections 41, 43, 45 . . . and 47, 49, 51, . . . , respectively between successive terminals 42, 44, 46, 48 . . . and 56, 54, 52, . . . . The terminals 42, 44, 46, 48 . . . are respectively connected with the contact members 26, 28, 30, 32 . . . by conductors 58, 62, 66, 70 . . . . The terminals 56, 54, 52 . . . are similarly connected with the contact members 36, 38, 40 . . . by conductors 64, 68, 72 . . . respectively. The contact member 34 is open-circuited.

When the contact arm 24 occupies its first, or illustrated position, in which it contacts with the contact members 26 and 34, a circuit is established from the conductor 7, by way of conductors 4 and 8, to the meter 14. The shunt resistor 12 is at this time open-circuited and the series resistor 10 is effectively reduced to zero. The circuit continues, by way of the conductor 6, through the pivot 25, the arm 24 and the contact member 26, and by way of the conductors 58 and 2, back to the conductor 5. In this position of the contact arm, therefore, the meter 14 is thrown directly across the line, and the input impedance is the impedance of the meter.

When the contact arm 24 occupies its second position, in which it bridges the contact members 28 and 36, the circuit is as follows: from the conductor 7, by way of the conductor 4, to the conductor 8, and the resistor 12 in parallel. The current in the conductor 8 passes through the meter 14 and the point 25 to the contact arm 24, as before described. The circuit continues by way of the contact members 36 and 28, and by way of the conductor 62, to the terminal 44, so that the circuit includes the portion 41 of the resistor 10 between the terminals 42 and 44.

The parallel branch circuit through the resistor 12 contains the whole resistor 12, the circuit continuing from the point 56, by way of the conductor 64, to the terminal 36.

In its third position, the contact arm 24 bridges the terminals 30 and 38, with the result that the series circuit contains the portions 41 and 43 of the resistor 10 between the terminals 42 and 46, and the shunt circuit contains the whole of the resistor 12, except the portion 47 between the terminals 54 and 56. In the fourth position of the contact arm 24, the portions 41, 43 and 45 of the series resistor 10 and the portions 47 and 49 only of the resistor 12, between the terminals 56 and 52, including the meter, are connected in circuit; and so on.

The resistors comprising the arms 10 and 12 are so constructed as to present a purely resistive load, independent of frequency, throughout the range over which the instrument is to be used, thus eliminating all possibility of changing the frequency characteristics of the junction.

The instrument, of course, will be so designed as to have a high input impedance in order that it shall draw but little power from the junction 5, 7, so as not to react on the junction, and so that the system shall operate as though the instrument were not connected with the junction.

Among the uses to which the present invention may be put are monitoring, as well as measuring the voice-power level, as in telephone conversations, power and voltage measurements, amplifier-gain-and-circuit-loss determinations, and equalization and measurements on voice circuits. It may be used to measure transmission characteristics, as in telephone circuits, and to control voice-signal amplification in radio broadcasting, and the phonographic and film recording of speech. The invention is adapted for use in all kinds of transmission and recording circuits and is useful wherever it is desired to control, check or indicate the electrical power transmitted from an electric source to a load. It may be used to measure the performance of the circuit, both while in use and for testing.

When connected across a transmission line carrying a program of voice and music, the instrument will indicate to an operator between what approximate power limits or levels the sound is being delivered past its terminals. Again, it having been found, by experience, at just what power level interfering speech becomes bothersome on a telephone circuit, and as this invention indicates just what the speech power level is, the operator will be enabled to hold the speech below the interfering level and above the noise level.

Modifications may obviously be made by persons skilled in the art, and all such are considered to fall within the spirit and scope of the invention, as defined in the appended claims.

What is claimed is:

1. A method of measuring the alternating electric power transmitted from a source of alternating electric power to a load along a junction, the said method comprising connecting across the junction a network having a high impedance in order that it shall draw but little power from the junction, the network being provided with an indicator having a predetermined range of movement, adjusting the network to vary the significance of the indications of the indicator, and maintaining the said impedance substantially constant irrespective of the adjustment of the network, the network being of such nature as to present a purely resistive load, independent of frequency, throughout the said range.

2. In a power-level indicator, a source of alternating electric power, a load, a junction connecting the source with the load, a network connected with the junction and having a high impedance in order that it shall draw but little power from the junction, an indicator controlled by the network having a predetermined range of movement, and means for adjusting the network to vary the significance of the indications of the indicator and for maintaining the said impedance substantially constant irrespective of the adjustment of the network, the network being of such nature as to present a purely resistive load, independent of frequency, throughout the said range.

3. In a power-level indicator, a source of alternating electric power, a load, a junction connecting the source with the load, a network having an input connection and an output connection, the input connection being connected with the junction, the input having a high impedance in order that the network shall draw but little power from the junction, a meter connected with the output connection and provided with an indicator having a predetermined range of movement, and means for adjusting the network to vary the significance of the indications of the indicator, the network adjustment being such that the impedance of the network is maintained substantially constant irrespective of the adjustment of the network and the network being of such nature as to present a purely resistive load, independent of frequency, throughout the said range.

4. In a power-level indicator, a source of alternating electric power, a load, a junction connecting the source with the load, a network having an input connection and an output connection, the input connection being connected with the junction, the input having a high impedance in order that the network shall draw but little power from the junction, a meter connected with the output connection and provided with an indicator having a predetermined range of movement, means for adjusting the network to vary the significance of the indications of the indicator, and means for maintaining the impedance of the network substantially constant irrespective of the adjustment of the network, the network being of such nature as to present a purely resistive load, independent of frequency, throughout the said range.

5. In a power-level indicator, a source of alternating electric power, a load, a junction connecting the source with the load, a network connected with the junction and having series and shunt arms, an input connection and an output connection connected with the network, the input connection being connected with the junction, the input having a high impedance in order that the network shall draw but little power from the junction, a meter connected with the output connection and provided with an indicator having a predetermined range of movement, and means for adjusting the series and shunt arms to vary the significance of the indications of the indicator and for maintaining the impedance of the network and the meter substantially constant irrespective of the adjustment of the series and shunt arms, the network being of such nature as to present a purely resistive load, independent of frequency, throughout the said range.

6. In a power-level indicator, a source of alternating electric power, a load, a junction connecting the source with the load, a network having an input connection and an output connection, the network being calibrated in logarithmic power units, the input connection being connected with the junction, the input having a high impedance in order that the network shall draw but little power from the junction, a meter connected with the output connection and provided with a scale calibrated in the said logarithmic power units and with an indicator having a predetermined range of movement over the scale, means for adjusting the network to vary the significance of the indications of the indicator, and means for maintaining the impedance of the network substantially constant irrespective of the adjustment of the network, the network being of such nature as to present a purely resistive load, independent of frequency, throughout the said range.

7. In a power-level indicator, a source of alternating electric power, a load, a junction connecting the source with the load, a network having a series arm and a shunt arm, an input connection and an output connection connected with the network, the input connection being connected with the junction, the input having a high impedance in order that the network shall draw but little power from the junction, a meter connected with the output connection and provided with an indicator having a predetermined range of movement, and means for adjusting the series arm and the shunt arm to vary the significance of the indications of the indicator and for maintaining the impedance of the network and the meter substantially constant irrespective of the adjustment of the series arm and the shunt arm, the network being of such nature as to present a purely resistive load, independent of frequency, throughout the said range.

In testimony whereof, I have hereunto subscribed my name.

JOSEPH WARREN HORTON.